Feb. 24, 1925.
L. H. SMILEY
INDICATOR
Filed May 19, 1923 — 2 Sheets-Sheet 1
1,527,279
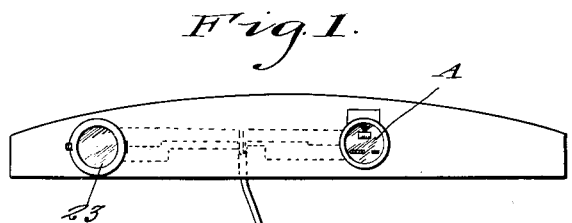
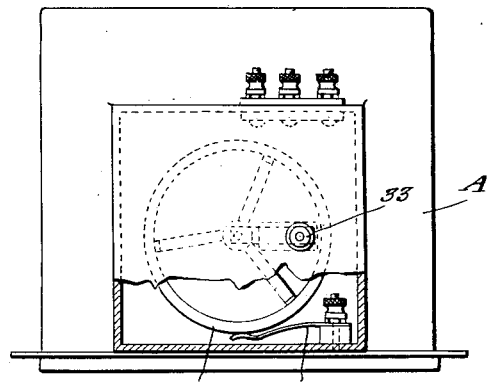
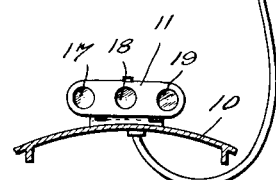
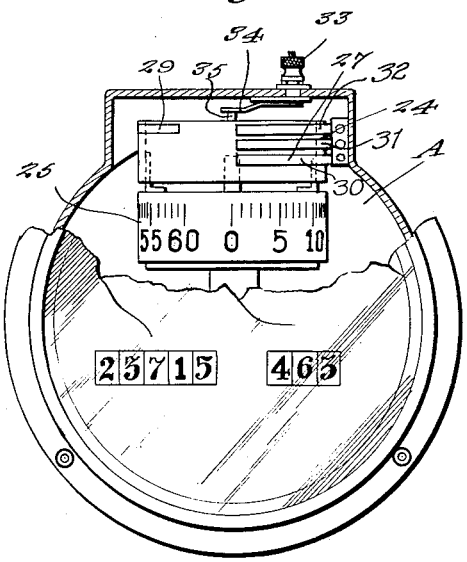
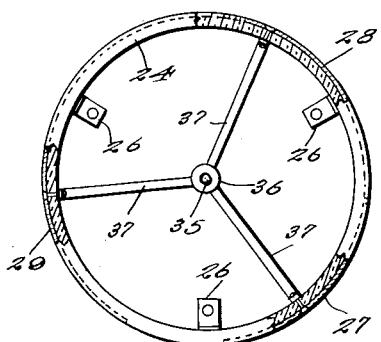
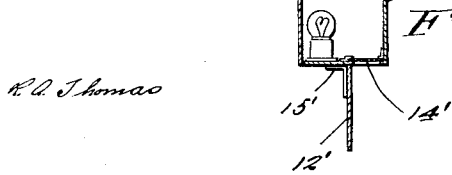
L. H. Smiley INVENTOR Feb. 24, 1925. 1,527,279
L. H. SMILEY
INDICATOR
Filed May 19, 1923 2 Sheets-Sheet 2
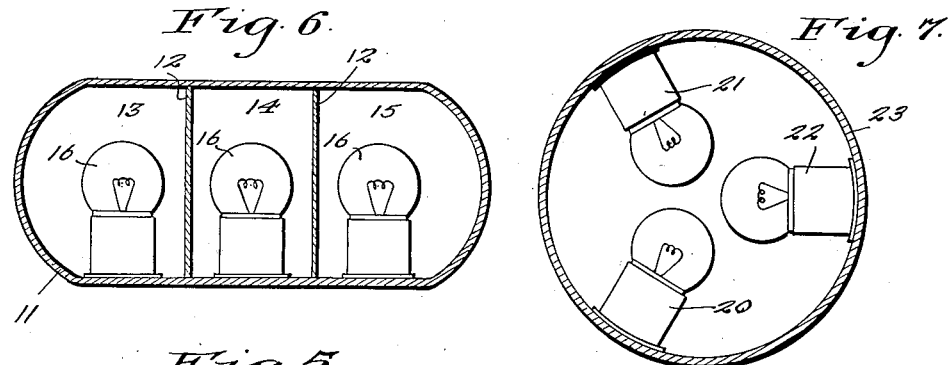
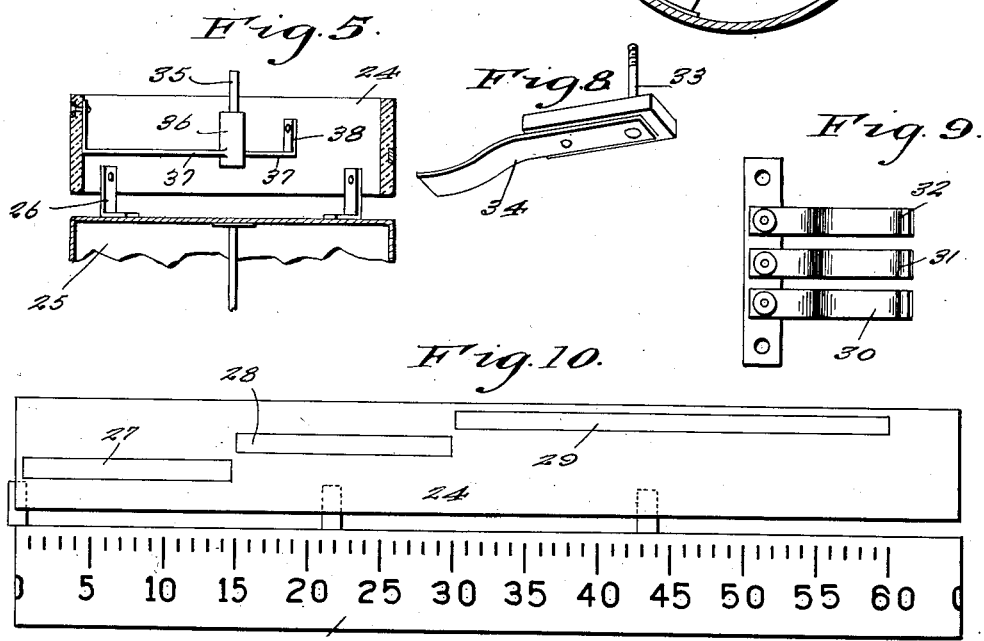
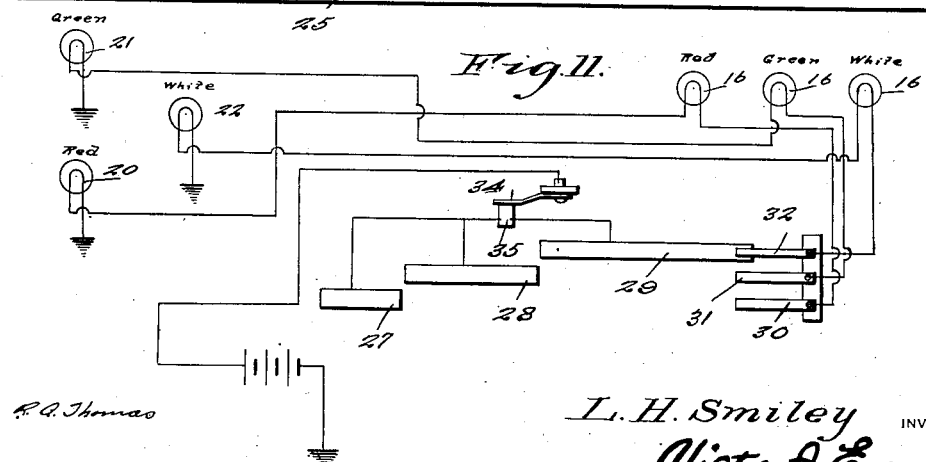
L. H. Smiley INVENTOR Patented Feb. 24, 1925.

1,527,279

UNITED STATES PATENT OFFICE.

LEMUEL H. SMILEY, OF AKRON, OHIO.

INDICATOR.

Application filed May 19, 1923. Serial No. 640,285.

*To all whom it may concern:*

Be it known that I, LEMUEL H. SMILEY, a citizen of the United States, residing at Akron, in the county of Summit and State of Ohio, have invented new and useful Improvements in Indicators, of which the following is a specification.

This invention contemplates the provision of a speed indicator for motor operated vehicles, wherein a plurality of signals are employed, and automatically and singly operated to indicate the speed at which the vehicle is travelling, the indicator being arranged upon the vehicle in full view of everyone so that officers and others may determine when the operator is violating the speed law of the particular place without necessarily trailing the vehicle.

More specifically stated, the invention preferably consists of a lamp casing divided into a plurality of compartments, each being equipped with a different colored lens, affording each compartment a particular significance regarding the speed at which the vehicle is travelling, and electric light bulbs in the respective compartments being automatically illuminated by means that is actuated by the speedometer, the means being designed to selectively operate the signals when the vehicle travels above a predetermined speed.

The nature and advantages of the invention will be better understood when the following detailed description is read in connection with the accompanying drawings, the invention residing in the construction, combination and arrangement of parts as claimed.

In the drawings forming part of this application, like numerals of reference indicate similar parts in the several views, and wherein:

Figure 1 is a compound view of the speedometer.

Figure 2 is a view of the speedometer and that part of the invention attached thereto, the speedometer casing being partly broken away.

Figure 3 is a top plan view with the casing partly broken away.

Figure 4 is a top plan view of the annulus supported by the speedometer.

Figure 5 is a sectional view through Figure 4, showing the manner of supporting the annulus by the speedometer.

Figure 6 is a sectional view through the casing containing the signals.

Figure 7 is a sectional view through the lamp casing which contains a plurality of telltale lights connected in circuits with the respective signals.

Figure 8 is a detail view of the resilient contact used in conjunction with the annulus above referred to.

Figure 9 is a detail view of the stationary contacts.

Figure 10 is an enlarged view of the speedometer and the associated annulus showing the arrangement of the contact strips carried thereby.

Figure 11 is a diagrammatic view.

Figure 12 is a view of a modified form showing the signal casing associated with the license tag.

Figure 13 is a sectional view taken on the line 13—13 of Figure 12.

Referring to the drawings in detail, 10 indicates a fender of a motor operated vehicle (not shown), and upon which fender the indicator is preferably mounted in a position where it can be readily and easily viewed by everyone within a certain radius of the vehicle. The indicator includes a plurality of signals, each having a particular significance regarding the speed of the vehicle, and these signals may be operated and arranged upon appropriate parts of the vehicle, or they may be all embodied in a single casing as shown in accordance with the preferred embodiment of the invention. Again, I desire to have it understood that the signals can be of any suitable character, audible or otherwise, for the purpose above pointed out.

As shown in this specific instance, the indicator comprises a lamp casing 11 which is divided by the partitions 12 into a plurality of spaced compartments 13, 14 and 15. In each compartment is arranged an electric light bulb 16 which are singly illuminated in a manner and for a purpose to be more fully described. As above stated, each signal or compartment is afforded a particular significance concerning the speed at which the vehicle is travelling when the signal is brought into use, and in carrying out this idea with the structure illustrated, each compartment must necessarily differ from the other compartment in color or in some other material respect. So that the compartment 13 is provided with a red lens 17, the compartment 14 having a green lens 18, while the compartment 15 is provided with a white lens 19. The compartment 13 is illuminated when the vehicle is travelling within the speed limits of the particular locality, as for instance anywhere between five and fifteen miles should the speed limit be fifteen miles in that particular place. It is of course to be understood that the mechanism can be so constructed and arranged, that any of the compartments can be selectively illuminated below or above a particular speed. Should the vehicle travel at a speed in excess of that allowed by law, and as above stated, fifteen miles an hour, the green light or compartment 14 will be illuminated to indicate to an officer or those by whom the vehicle passes, that the driver is violating the speed regulations without the necessity of trailing the vehicle. The compartment 14 functions for this purpose within the city limits, and of course is of no particular value in the country or beyond the city limits where the speed regulations generally permit the vehicle to travel at approximately thirty or thirty-five miles an hour. But when travelling on country roads or the like, should the speed of the vehicle be in excess of that allowed by the regulations, say for instance thirty or thirty-five miles an hour, the compartment 15 is illuminated to serve the same purpose pointed out in connection with the compartment 14 within the city limits. It will be further observed that the compartment 13 which is provided with a red lens can serve in the capacity of a tail light, in addition to an indicator for the purpose above mentioned.

Included in the circuits of the respective signals is a plurality of electric light bulbs 20 represented at 21 and 22 all of which are arranged in a suitable casing 23 mounted upon the instrument board, and used as a telltale light so that the driver or operator of the vehicle will always be informed of the working condition of the indicator at the rear of the vehicle. The bulb 20 is red in color to harmonize with the lens 17 of the compartment 13 of the indicator which of course is simultaneously illuminated with the bulb 20. For the same purpose a bulb 21 is green in color to cooperate with the compartment 14, while the bulb 22 is white to harmonize with the lens of the compartment 15.

While any suitable means may be employed for selectively operating the signals when the vehicle is travelling above a predetermined speed, I preferably make use of the means illustrated which is directly connected with and operated from the speedometer indicated generally at A in Figure 2. The means for this purpose includes an annulus 24 which is supported upon the cylindrical rotary member 25 forming part of the speedometer by suitable brackets 26 shown in Figure 5. The annulus 24 is of course constructed of insulated material, open at both ends, and of uniform diameter. This annulus is provided with a plurality of contact strips of varying lengths, there being one contact strip for each signal above described. For instance, the contact strip for the signal 13 is indicated at 27 and is comparatively short and arranged in a plane beneath the adjacent contact strip 28 for the signal 14. While this in turn is also considerably shorter and arranged upon the plane occupied by the contact strip 29 for the signal 15. These contact strips are successively brought into engagement with one of a plurality of fixed contacts arranged within the speedometer casing, so that the circuit to a particular signal is closed when the vehicle reaches a predetermined speed. As shown in Figure 9, the fixed contact 30 is arranged in the path of movement of the contact strip 27, so that when the vehicle is travelling at a speed anywhere between five and fifteen miles, presuming this to be the speed limit in a particular jurisdiction, the signal 13 remains in operation incident to the engagement between the strip 27 and the fixed contact 30. Again, the fixed contact 31 in Figure 9 is arranged in the path of movement of the contact strip 28, so that as the speedometer is rotated the proper distance, as the speed of the vehicle is increased above fifteen miles an hour, and between the speeds of fifteen and thirty miles an hour, the strip 28 engages the contact 31 and of course operates the signal 14, at which time the signal 13 is rendered inoperative. So also, when the vehicle is travelling at a speed greater than thirty miles an hour, the strip 29 of the annulus is brought into engagement with the fixed contact 32 thereby operating the signal 15.

It is necessary that the contacts 27, 28, and 29 carried by the annulus which is always energized, and consequently I provide the speedometer casing A with a binding post 33 which in turn is associated with a resilient contact 34 constantly arranged in engagement with a pin 35 projecting above the upper edge of the annulus 24. This pin 35 is received by a hub like member 36 from which radiates a plurality of arms 37, there being one of these arms for each contact strip carried by the annulus 24, each arm having an offset extremity 38 which is directly connected with the adjacent contact strip. Therefore current flows from a suitable source to the binding post 33 thence to the resilient contact 34, pin 35, hub 36, and thence through the arms 37 to the various contact strips 27, 28 and 29.

In Figures 12 and 13, I have shown a modified form of the invention wherein the lamp casing 11' is associated with the license tag 12'. This construction is preferred when the signal is used at the rear of the vehicle in contra-distinction to being supported upon the fender as shown in Figure 1. The bottom of the lamp casing is in part formed of transparent material 14' so that the light will shine upon the face of the license tag 12' which is supported by the bottom of the casing immediately adjacent the transparent member 14'. The tag can be associated with the casing in any suitable manner but preferably by brackets 15' of the construction shown in Figure 13.

While it is believed that from the foregoing description, the nature and advantages of the invention will be readily apparent, I desire to have it understood that I do not limit myself to what is herein shown and described and that such changes may be resorted to when desired as fall within the scope of what is claimed.

Having thus described the invention, I claim:

The combination with the speed indicator for automobiles including a rotatable graduated indicator, of an annulus of non-conducting material arranged above and fixed to rotate with the rotatable indicator, a plurality of conductor strips arranged in stepped relation on the periphery of the annulus, said strips being graduated in length and adapted to be electrically connected to an independent signalling circuit and a plurality of resilient contacts arranged at one side of the annulus and extending in a plane parallel to the plane of rotation of the annulus, the spaced contacts being normally engaged with the periphery of the annulus and each of the same being adapted to engage the conductor strips, the spaced contacts being adapted to be connected with a source of electrical energy.

In testimony whereof I affix my signature.

LEMUEL H. SMILEY.